United States Patent
Woodell et al.

(10) Patent No.: US 7,372,394 B1
(45) Date of Patent: May 13, 2008

(54) VARIABLE LOOP GAIN AND RESOLUTION PULSE SYSTEM AND METHOD WITH POINT TARGET EDITING CAPABILITY

(75) Inventors: Daniel L. Woodell, Robins, IA (US); Roy E. Robertson, Marion, IA (US); Charles J. Dickerson, Alburnett, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 182 days.

(21) Appl. No.: 11/235,449

(22) Filed: Sep. 26, 2005

Related U.S. Application Data (63) Continuation-in-part of application No. 11/074,531, filed on Mar. 8, 2005, now abandoned.

(51) Int. Cl.
   *G01S 13/95* (2006.01)
(52) U.S. Cl. .................................. 342/26 R; 342/26 B
(58) Field of Classification Search .............. 342/26 R, 342/26 A, 26 B, 26 C, 26 D, 89–97, 162, 342/195
   See application file for complete search history.

(56) References Cited

U.S. PATENT DOCUMENTS

| | | | |
|---|---|---|---|
| 3,838,422 A * | 9/1974 | MacArthur et al. ........... | 342/93 |
| 4,062,012 A * | 12/1977 | Colbert et al. ................. | 342/90 |
| 4,835,536 A | 5/1989 | Piesinger et al. | |
| 5,049,886 A | 9/1991 | Seitz et al. | |
| 5,077,558 A | 12/1991 | Kuntman | |
| 5,198,819 A | 3/1993 | Susnjara | |
| 5,311,183 A | 5/1994 | Mathews et al. | |
| 5,517,193 A * | 5/1996 | Allison et al. ............ | 342/26 R |
| 5,568,151 A * | 10/1996 | Merritt ........................ | 342/192 |
| 5,608,514 A * | 3/1997 | Stann et al. ................ | 356/5.09 |
| 5,831,570 A * | 11/1998 | Ammar et al. ............ | 342/26 B |
| 5,945,926 A | 8/1999 | Ammar et al. | |
| 6,018,307 A * | 1/2000 | Wakayama et al. ....... | 342/26 D |
| 6,201,494 B1 | 3/2001 | Kronfeld | |
| 6,208,284 B1 | 3/2001 | Woodell et al. | |
| 6,229,475 B1 * | 5/2001 | Woolley ....................... | 342/93 |
| 6,388,607 B1 | 5/2002 | Woodell | |
| 6,388,608 B1 | 5/2002 | Woodell et al. | |
| 6,424,288 B1 | 7/2002 | Woodell | |
| 6,456,226 B1 | 9/2002 | Zheng et al. | |
| 6,512,476 B1 | 1/2003 | Woodell | |
| 6,549,161 B1 | 4/2003 | Woodell | |

(Continued)

OTHER PUBLICATIONS

"Spatial resolution and processing tradeoffs for HYDROS: application of reconstruction and resolution enhancement techniques", Long, D.G.; Spencer, M.W.; Njoku, E.G. Geoscience and Remote Sensing, IEEE Trans on vol. 43, Issue 1, Jan. 2005 pp. 3-12.*

*Primary Examiner*—John B Sotomayor
(74) *Attorney, Agent, or Firm*—Nathan O. Jensen; Kyle Eppele (57) ABSTRACT

A weather radar system is coupled to antenna. The weather radar system includes a processor for generating pulses and for processing return pulses received by the antenna. The processor generates high resolution data from the return pulses. The processor uses the high resolution data to perform high resolution radar analysis including removal of point and/or point-like target returns and reassembles the high resolution data to perform high gain radar analysis at lower resolutions.

20 Claims, 11 Drawing Sheets

U.S. PATENT DOCUMENTS

| | | |
|---|---|---|
| 6,597,305 B2 | 7/2003 | Szeto et al. |
| 6,603,425 B1 | 8/2003 | Woodell |
| 6,690,317 B2 | 2/2004 | Szeto et al. |
| 6,741,203 B1 | 5/2004 | Woodell |
| 6,850,185 B1 | 2/2005 | Woodell |
| 6,879,280 B1 | 4/2005 | Bull et al. |
| 6,882,302 B1 | 4/2005 | Woodell et al. |
| 7,042,387 B2 | 5/2006 | Ridenour et al. |
| 7,242,343 B1 * | 7/2007 | Woodell ............. 342/26 B |
| 7,292,178 B1 * | 11/2007 | Woodell et al. ........ 342/26 B |
| 2003/0016156 A1 | 1/2003 | Szeto et al. |
| 2007/0046526 A1 * | 3/2007 | O'Hora et al. ......... 342/26 R |

* cited by examiner

VARIABLE LOOP GAIN AND RESOLUTION PULSE SYSTEM AND METHOD WITH POINT TARGET EDITING CAPABILITY

CROSS-REFERENCE TO RELATED PATENT APPLICATIONS

The present application is a continuation in part of and claims priority to U.S. Ser. No. 11/074,531, now abandoned, filed Mar. 8, 2005 by Daniel L. Woodell, Roy E. Robertson and Charles J. Dickerson entitled, "Removal of Spurious Aircraft Detection on Weather Radar," and assigned to the Assignee of the present application. The entire contents of U.S. application Ser. No. 11/074,531 is herein incorporated by reference. A petition to revive U.S. application Ser. No. 11/074,531 is currently pending.

BACKGROUND OF THE INVENTION

This application relates to weather radar systems. More particularly, this application relates to weather radar system having improved performance.

Weather radars are known in the art for detecting and displaying severe weather to a crew in an aircraft on a two-dimensional map display showing range, bearing, and intensity of a detected weather system, which may be convective or stratiform in nature. Flight hazards due to weather conditions are primarily the result of precipitation and turbulence. Airborne weather radars have been optimized to detect rain.

As weather radars become more sensitive and process previously stored sampled state information, other aircraft are being detected and displayed to flight crews when not desired. Newer radars use longer transmitter pulse widths that make the problem worse since the length of the radar return from aircraft on the radar display is not substantially different from the radar return length as produced by a small area weather feature.

A spurious aircraft may appear as multiple images on a weather radar system display due to storage of the target echo in internal memory and the motion of the spurious aircraft. Having a weather display with spurious aircraft displayed is undesirable since it may lead to difficult decision making about the weather and the spurious aircraft motion.

In addition, next generation radar systems, such as wind shear radar systems, are utilizing smaller antennas. Smaller antennas generally have a larger beam width. Accordingly, such systems can be more susceptible to receiving ground clutter.

Thus, there is a need for a reliable low-cost system for detection and removal of spurious aircraft and/or ground clutter from a weather radar display. Further, there is a need for a weather radar system that can utilize smaller antennas and yet achieve suitable performance. Further still, there is a need for a weather radar having variable loop gain and resolution with point target editing capability. Yet further still, there is a need for a weather radar system that can utilize a pulse compression and demodulation with code technique to achieve the advantages of both compressed pulse lengths and long pulses. Further still, there is a need for a reliable system capable of distinguishing between volume targets and point targets. Yet further still, there is a need for a weather radar system that achieves the advantages of high resolution and high loop gain.

SUMMARY OF THE INVENTION

An exemplary embodiment relates to weather radar system. The weather radar system can be coupled to an antenna. The weather radar system includes a processor for generating pulses and for processing return pulses received by the antenna. The processor generates high resolution data from the return pulses. The processor uses the high resolution data to perform high resolution radar analysis. The high resolution analysis may be sued to identify and separate out point or point-like non-weather target returns from weather returns. The edited high resolution data can then be integrated in range to produce weather data at any of several selected loop gain/resolution combinations. High resolution pulses for the weather radar system can be provided by the compression of long pulses or the generation of short pulses.

Another exemplary embodiment relates to a method of detecting a weather system using an avionics weather radar system. The method includes steps of transmitting pulses from a transmitter, receiving return pulses, and generating high resolution data from the return pulses. The method also includes using the high resolution data to form high gain data, and displaying the weather system in response to the high resolution data and the high gain data.

Another exemplary embodiment relates to an avionic weather radar system. The avionic weather radar system includes means for analyzing high resolution data associated with radar returns, and means for accumulating the high resolution data to form high gain data.

BRIEF DESCRIPTION OF THE DRAWINGS

The invention may be more fully understood by reading the following description of the preferred embodiments of the invention in conjunction with the appended drawings wherein.

DETAILED DESCRIPTION OF THE PREFERRED EMBODIMENTS

Exemplary embodiments in the present application are for a system and method to detect and remove point or point-like targets (e.g., spurious aircraft, ground targets, etc.) from a weather radar display that can be incorporated into an existing weather radar system. Several embodiments are disclosed that can be used individually or in combination to improve performance.

In a preferred embodiment, a weather radar system 10 is optimized for variable loop gain and high resolution. The preferred embodiment can achieve point target editing capabilities. As explained below with reference to FIGS. 10 and 11, a variable loop gain and resolution technique can provide for a low cost weather radar system that reduces clutter associated with point or point-like targets and yet provides accurate display of desired weather features.

The preferred embodiment advantageously allows range resolution and loop gain to be actively traded back and forth as desired. This variable resolution and loop gain advantageously allows for a range of operational improvements for the weather radar system. Applicants believe that at least one of these operational improvements allows windshear operation with smaller antennas than is conventionally possible.

Figure 1:
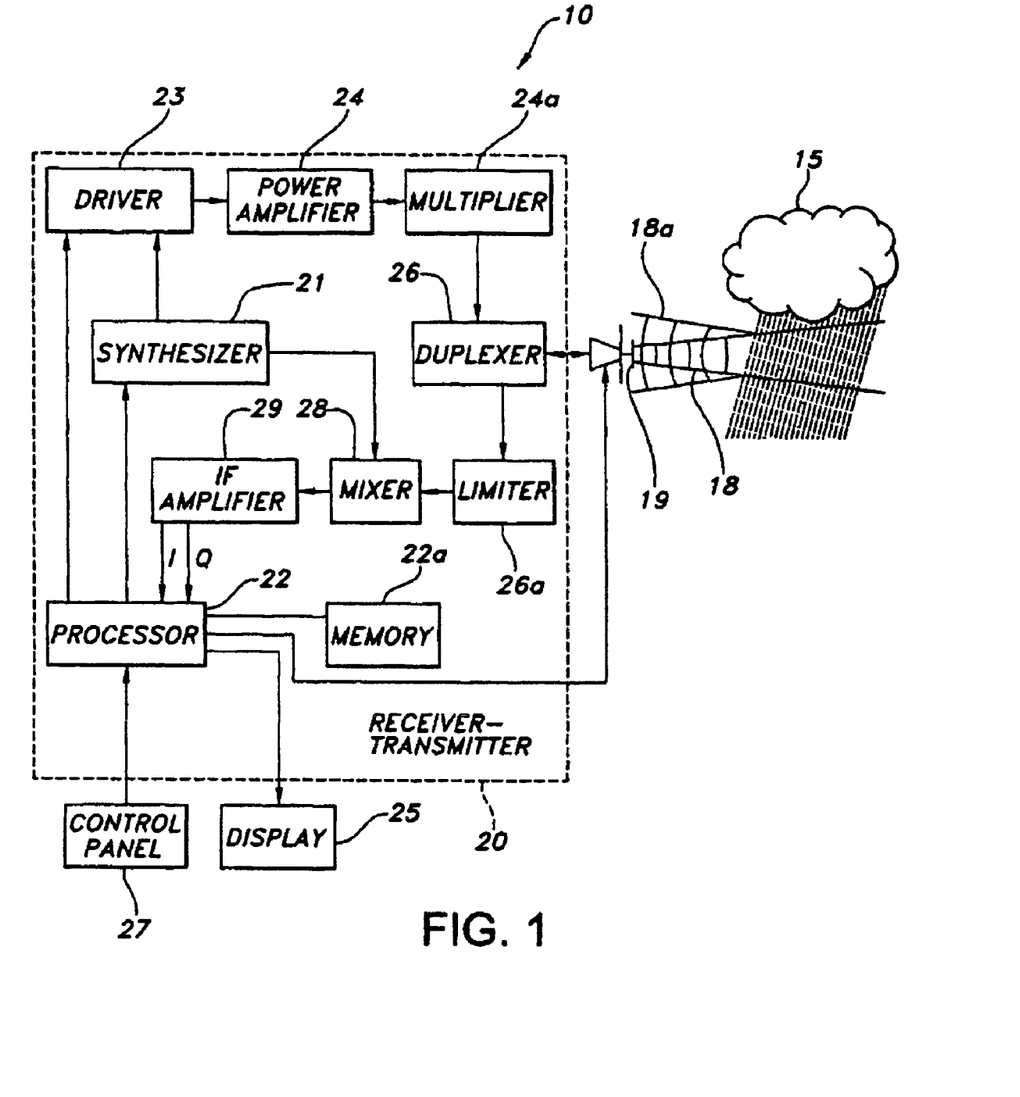
FIG. 1 is a block diagram of an exemplary weather radar system.

Weather radars are known in the art for detecting severe weather and for providing a flight crew in an aircraft a two-dimensional map display showing range, bearing, and intensity of detected weather systems. Flight hazards due to weather conditions are primarily the result of precipitation and turbulence. A block diagram of a representative weather radar 10 that may incorporate any embodiment in the present application is shown in FIG. 1. The weather radar 10 may be a WXR-2100 MULTISCAN Weather Radar System manufactured by Rockwell Collins Inc. and used herein as an exemplary weather radar system in which to incorporate the present invention.

In FIG. 1, pulses 18 are transmitted from the weather radar system 10 using antenna 19 and reflected from a target 15 as return pulses 18a that are received by the antenna 19. Within a receiver-transmitter 20, the transmitted pulses 18 are generated using a reference signal from a synthesizer 21. The width and pulse repetition frequency (PRF) of the pulses 18 are generated in a driver 23 and controlled by a processor 22. The pulses 18 are amplified in power amplifier 24 and multiplied to a final transmit frequency in multiplier 24a. A duplexer 26 directs the multiplier 24a output to the antenna 19.

The return pulses 18a from the target 15 are passed through the duplexer 26 to a limiter 26a where strong return pulses 18a are attenuated. The output of the limiter 26a is connected to a mixer 28 where the return pulses 18a are down converted in frequency by mixing with an oscillator signal from the synthesizer 21 to produce an intermediate frequency (IF) return signal that is amplified by an IF amplifier 29.

The IF return signal is converted into in-phase (I) and quadrature (Q) components and digitized in the IF amplifier 29. The digitized return signals are then processed by the processor 22. The processor 22 uses a series of algorithms to determine the magnitude, spectral width, and velocity gradients of each return pulse 18a.

The results of the processed returns are then encoded to a serial data word that is sent to a system display 25. Encoded in the serial data word is the reflectivity data and message information to be displayed to the flight crew. The colors on the display 25 indicate the reflectivity with black representing zero to minimal reflectivity, green representing light reflectivity, yellow indicating moderate reflectivity, red representing heavy to extreme reflectivity, and magenta indicating turbulence.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The amount of energy returned in the return pulses I & Q depends on the reflective quality of the target 15. When pulses strike a target 15 such as precipitation, some of the energy is absorbed, some of it is refracted, and the remainder is reflected. Heavy rainfall produces the strongest reflections; light rainfall, snow, and ice crystal produce weak returns.

The strength of the return pulses 18a is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses when the receiver is listening for return pulses.

The return pulses 18a provide strength information and range to the target 15 such as a thunderstorm in FIG. 1. The range of the target 15 is determined by the amount of elapsed time that occurs between the transmission of a pulse 18 and the reception of the reflected or return pulse 18a. The direction or azimuth bearing of the target 15 is determined by noting the azimuth pointing position of the antenna 19. Bearing and range information is then coupled with the reflectivity information and applied to the display 25.

The exemplary WXR-2100 MULTISCAN Weather Radar System is capable of operating in an automatic multiscan mode with processor 22 controlling the weather radar system gain and antenna 19 tilt functions over multiple tilt settings and storing the individual scan data in a memory 22a of the system receiver-transmitter 20. This scan data is continually refreshed and corrected in the memory 22a for aircraft motion by processor 22. The data sent to the system display 25 is a composite of multiple scans that have been processed to remove ground clutter and refine the image. This operation optimizes the display images shown to the flight crew by showing short, mid, and long range weather targets.

In the exemplary weather radar system 10, the total time required to complete one cycle of multiple tilt scans in any of the weather detection modes except windshear is eight seconds. In the windshear mode a complete cycle requires 11.2 seconds. The digital image is translated and rotated in the memory 22a under processor 22 control to compensate for aircraft movement during the multiple scans. This weather radar operation is described in U.S. Pat. No. 6,424,288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell, both patents assigned to the assignee of the present application, and incorporated herein by reference.

Figure 2:
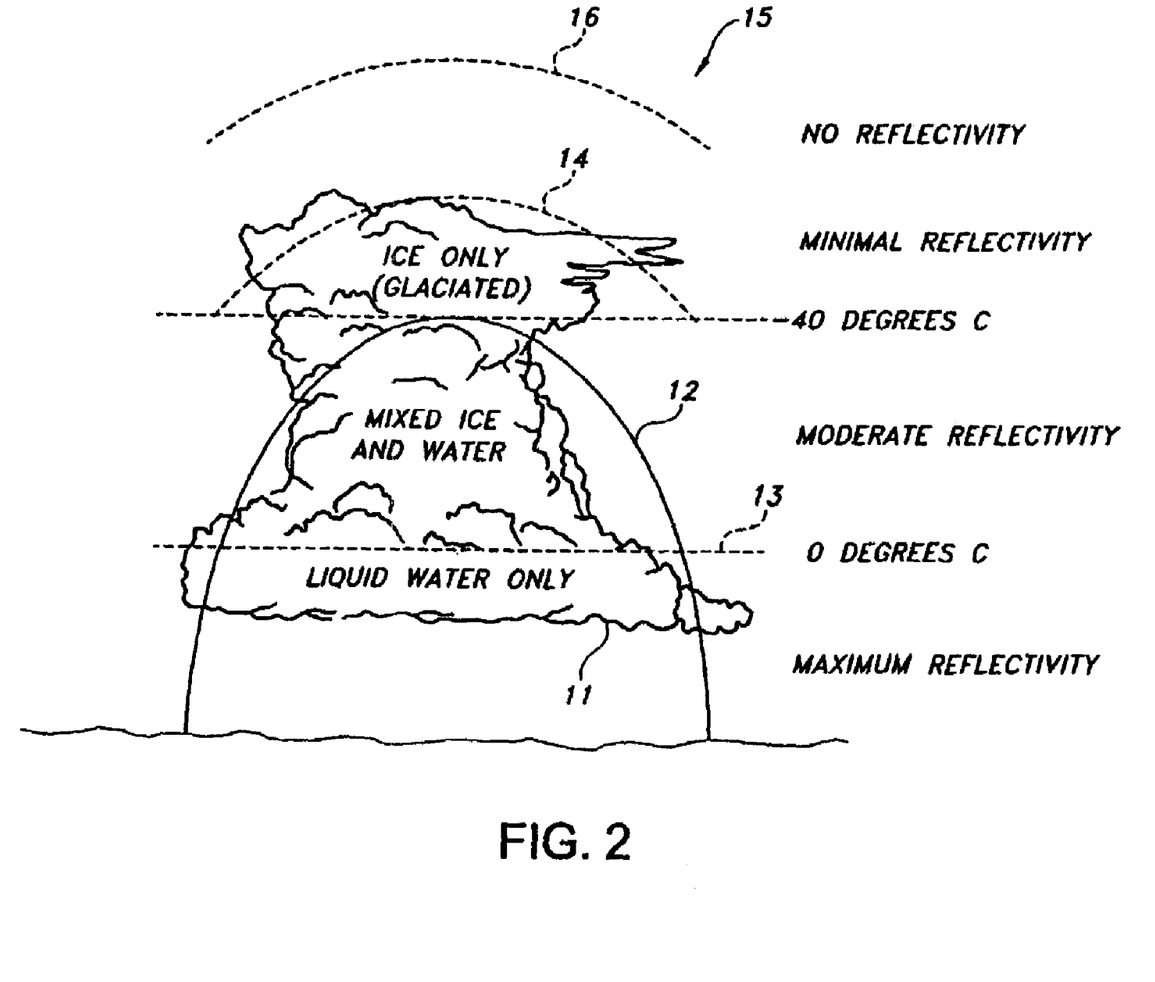
FIG. 2 is a diagram illustrating the geometric distribution of typical thunderstorm.

To understand multiscan operation, it is necessary to understand a typical thunderstorm. FIG. 2 is a diagram illustrating the geometric distribution of typical thunderstorm 15. A portion 11 of thunderstorm 15 at the lowest altitude contains liquid water only. This wet portion 11 has a high level of radar reflectivity. Above a freezing level 13, thunderstorm 15 includes a mixture of ice and water, with moderate radar reflectivity, and a portion of thunderstorm 15 above a temperature level of about −40 degrees C. contains ice only, with relatively low radar reflectivity. Above the ice portion of thunderstorm 15, there is a region 16 with little or no radar reflectivity, where turbulence may exist due to a building thunderstorm 15.

Based on the geometry of thunderstorm 15, regions may be defined by their ability to be detected by radar, their visibility, and their effect on an aircraft. Region 12, which includes the liquid water and the mixed ice and water portions of thunderstorm 15, is a region that is detectable by the aircraft weather radar system 10, due to the high and moderate radar reflectivity of those portions of the thunderstorm 15. Region 14, which includes the ice portion of thunderstorm 15, is a region that is visible to a pilot but is not normally detectable by radar, due to the low radar reflectivity of the ice portion of thunderstorm 15. Region 16 is not visible or detectable by radar, but is a region of possible high turbulence that can affect the stability of an aircraft passing through.

Since most weather threats are associated with convective weather such as thunderstorm 15, the detection of convective weather should be optimized throughout such weather's maturity cycle. Optimal convective weather detection samples the region of space at or near the freezing altitude 13 in the atmosphere since detectable reflectivity begins at this attitude and reflectivity is strongest at this altitude for most of a convective weather cell's life cycle.

Figure 3:
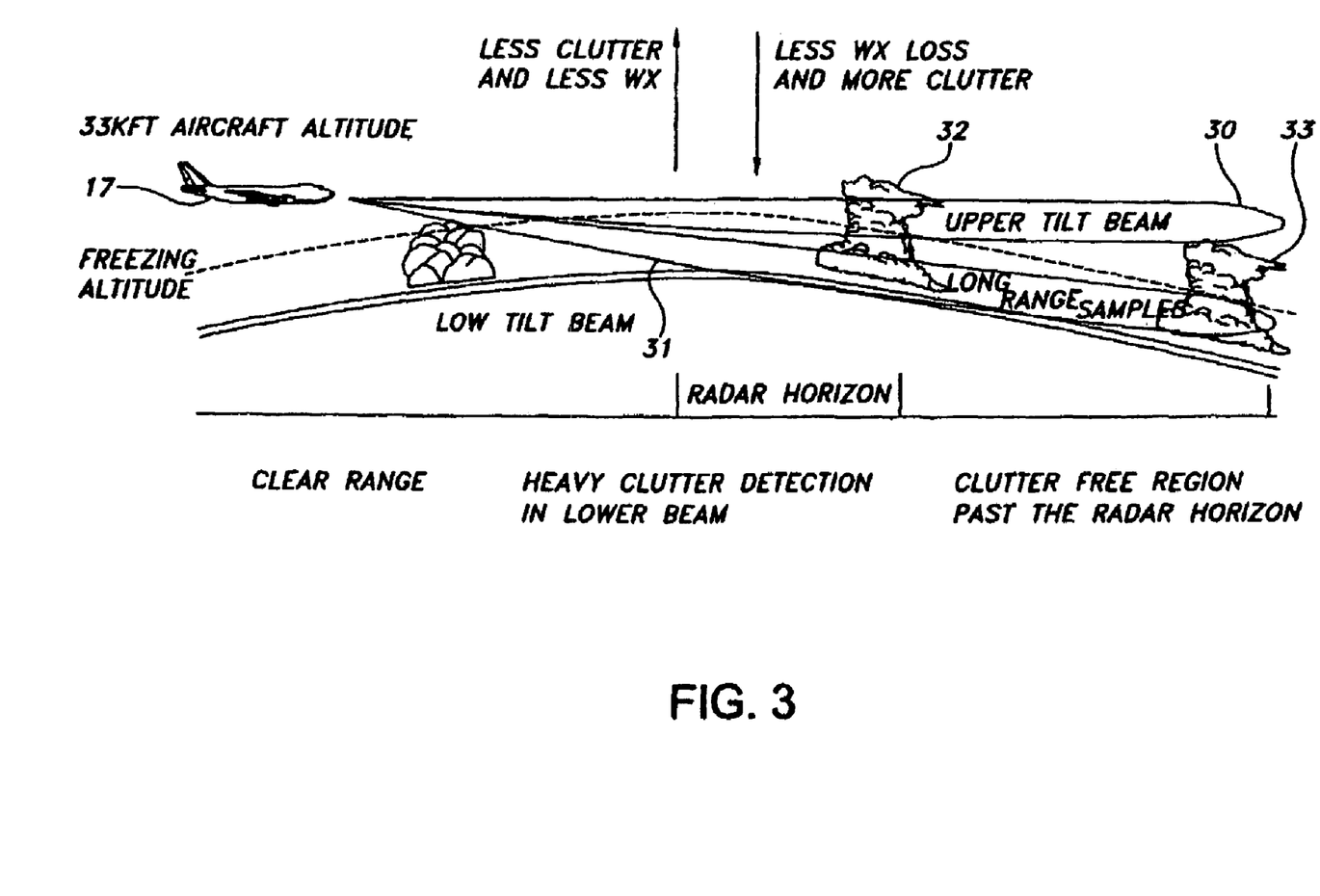
FIG. 3 illustrates multiscan operation of the weather radar system of FIG. 1.

FIG. 3 shows an aircraft 17 flying at 33,000 feet using an upper tilt beam 30 and lower tilt beam 31 to illuminate weather (precipitation) targets 32 and 33. During multiscan operation the receiver-transmitter 20 transmits, during a clockwise sweep, a non-windshear pulse pattern at the upper tilt angle. The next sweep the receiver-transmitter 20 transmits the non-windshear pulse pattern at the lower tilt angle. The tilt angles used during multiscan operation are dependent upon aircraft 17 barometric altitude and the terrain height. Reflectivity data is gathered from both tilt scans at four different frequencies using two different pulse widths. The data is placed into memory 22a in memory planes with each scan generating a short pulse memory plane (0 to 44 nm) and a long pulse memory plane (0 to 331 nm). For the upper tilt beam 30 and lower tilt beam 31, four memory planes are generated.

The processor 22 performs several algorithms that identify ground clutter within the reflectivity using scan-to-scan correlation and beam-to-beam correlation. The data stored in the memory planes is used to support all selected ranges, modes of operation, and selected display options. Transmit pulse widths of 6 and 25 microseconds build 512 sample bins for long range data and 256 sample bins for short range data in the multiscan system.

The memory 22a is geographically aligned in memory planes. The data in each plane is located so that the target data can be correlated between each of the memory planes. The data stored is averaged and filtered with each subsequent scan. The data is continually refreshed and corrected for aircraft motion. All significant weather data is available in the memory planes.

When the data is processed for display, the data from the short range pulses and long range pulses from both the upper and lower tilt scans is merged, ground clutter eliminated, the flight crew commanded display options are processed and the weather optimized display data is sent to the display 25. The data sent to the display 25 is generated from the four memory planes and not directly related to the antenna scan. The data sampling process has been decoupled from the display 25 process to provide the multiple beam advantage of a merged, optimized display of weather targets from 0 to 320 nm.

Multiscan is designed for fully automatic operation. For automatic operation the flight crew selects the automatic function, a display mode WX (weather), WX+T (weather plus turbulence), or TURB (turbulence), and a desired range. Once in automatic multiscan mode the processor 22 adjusts antenna 19 tilt and receiver gain to provide an optimum weather display for any range scale. In the WX+T and TURB modes, turbulence is displayed out to 40 nm for all selected ranges. Because multiscan operation uses multiple scans to detect all significant weather targets, the entire weather picture from 0 to 320 nm is stored in memory 22a. This includes turbulence data and precipitation velocity variances.

Turbulent areas within a precipitation weather target 15 can be identified by Doppler processing of transmit and receive signals in the weather radar system 10. A turbulent target is a target that exhibits a wide variance in particle velocities. The velocity variance of droplets can be thought of as a spectrum of velocities. The broader the spectrum, the greater the turbulence present in the weather target. To provide an accurate spectrum of return signal frequencies, a large number of samples (returns) must be used to produce accurate and reliable results. The threshold of turbulent targets in precipitation exceeds a velocity width of 5 meters/second. This threshold translates into a Doppler frequency shift of 312.5 Hz. For this reason, PRF (pulse repetition frequency) in the turbulence mode of operation is increased to 1838 pulses/second. With this large number of transmit pulses 18, the receiver-transmitter 20 processes every pulse for precipitation information and provides turbulence data from the spectrum of Doppler shifts caused by precipitation movement. Because of the high PRF rate, the maximum range for turbulence detection is approximately 44 miles.

Once an accurate spectrum of return signals is obtained, turbulence processor circuits or software determine if the spectrum represents a spectrum of a turbulent target. The alert threshold for passenger carrying air transport aircraft is approximately 5 to 7.5 meters-per-second. The five meter-per-second threshold corresponds to the threshold between light and moderate turbulence that can cause food and beverage spillage or possible minor injury.

The frequency of the return signal is offset from the transmitted frequency because of the Doppler shift caused by the velocity of the aircraft 17 with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out.

The pulse width transmitted is selected based upon the selected range and mode of operation. By using multiple pulse widths, the receiver-transmitter 20 can optimize the operation of the system for a particular range and operation mode. This optimization provides a better resolution in the weather display and efficient use of the transmitted energy. Another factor selected in the receiver-transmitter 20 to optimize performance is the pulse repetition frequency (PRF). PRF optimization is possible with separating detection from assessment. At shorter selected ranges, the receiver portion of the receiver-transmitter 20 is not required to listen for relatively long periods of time. The transmitter is then free to increase the number of transmitted pulses 18. The greater number of transmitted pulses 18 provides more information and a faster update of weather targets present. The PRF may be optimized for detection of a weather system and then changed to a PRF optimized for assessment.

Figure 4:
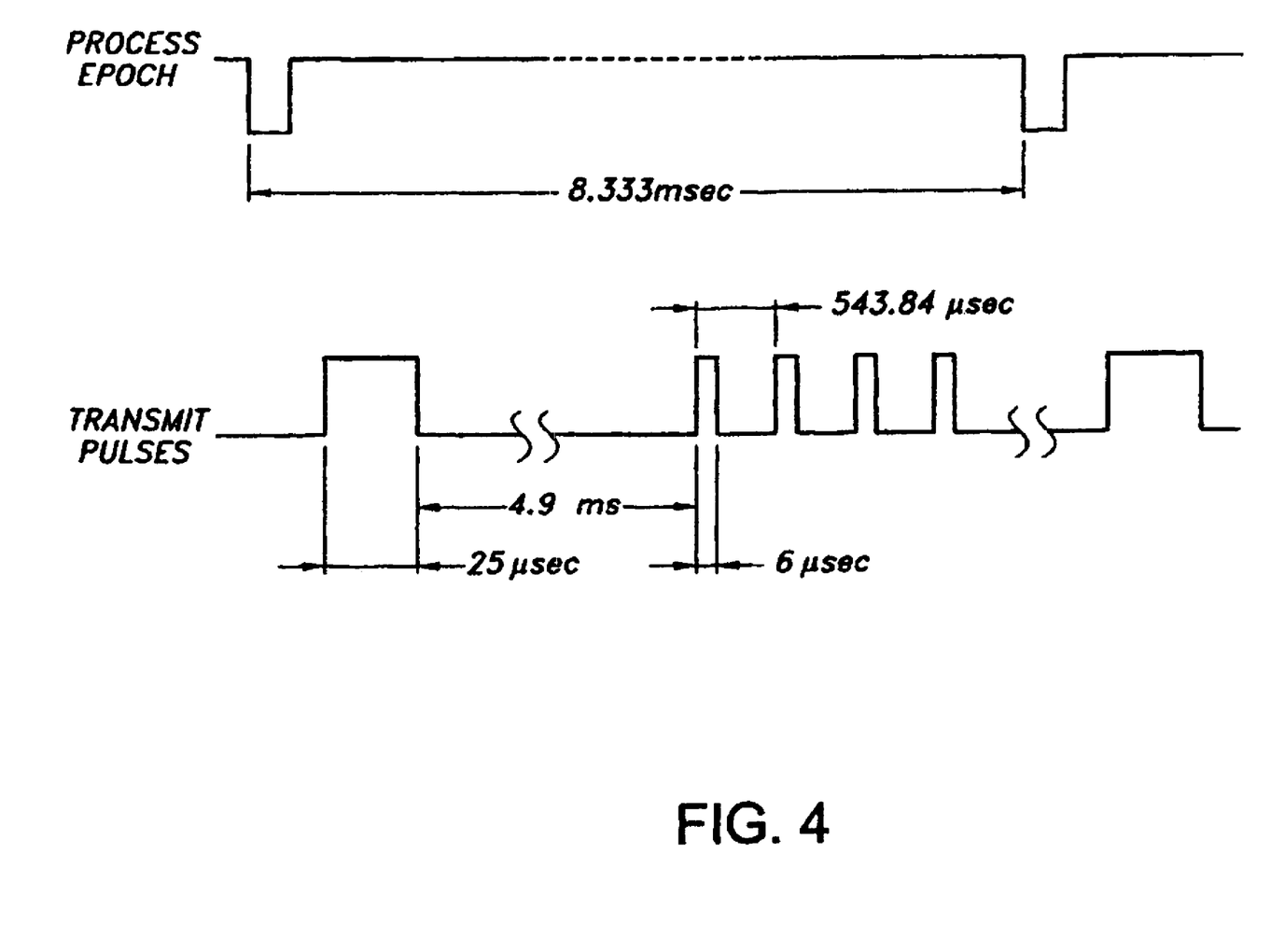
FIG. 4 shows a typical pattern of transmitted pulses for non-windshear operation in the weather radar system of FIG. 1 for a reflectivity mode.

A typical pattern of transmitted pulses 18 for non-windshear operation in the weather radar system 10 is shown in FIG. 4 for the weather mode. For any selected range one 25-microsecond pulse and four 6-microsecond pulses are transmitted during each process epoch of 8.333 milliseconds in this example. After transmitting the 25-microsecond pulse there is a 4.9-millisecond space. This allows returns from targets as far away as 331 nautical miles. Other pulse patterns (not shown) are possible such as a compressed long pulse with high range resolution with or without the simple short pulses. Compressed long pulse compression techniques known in the art have range resolution similar to short pulses.

A process epoch is the time interval in which a radial radar data is processed. This time is equal to the size of the radar processing element in degrees divided by the antenna 19 scan rate in degrees per unit time. This pulse pattern is transmitted at each radial of the radial of the scanning antenna 19. The transmitting frequency alternates between seven weather transmit channel frequencies. For example, the weather radar system 10 is operating in a weather detection mode and the antenna 19 is scanning clockwise. At the 0-degree radial the transmitter transmits the pulse pattern of FIG. 4 on a first transmit channel frequency of seven frequencies.

At the completion of the epoch, the antenna 19 moves a three eights-degree clockwise and the pulse pattern is transmitted again at one of six remaining frequencies. At the next three eights-degree radial of the antenna 19, the transmit pulse pattern is repeated at one of the remaining six transmit frequencies. The pulse pattern and seven frequencies are used for all non-windshear modes of operation such as weather, turbulence, weather plus, turbulence, and ground mapping detection.

The system and method of the present application can advantageously be incorporated into the weather radar system 10 to detect and remove point or point-like targets from the weather radar display 25. The operational details, thresholds, architecture, and processes of system 10 are not described in a limiting fashion and are provided as exemplary information. System 10 can be any type of weather radar system including single scan, multiple scan, or volume scan systems. Systems and subsystems described as circuits can utilize software to implement some or all of the described functionality. Changing operational parameters and architecture to incorporate embodiments into various types of radar systems does not depart from the scope of the invention.

Several embodiments are disclosed that include differentiating radar return length, estimating vertical gradients of reflectivity, tracking radar returns into regions that are eliminated from the weather display to provide differentiation, tracking areas of radar returns that allow detection and removal of the spurious aircraft based on relative geometries. These embodiments may be used individually or in any combination to detect and remove point or point-like targets (e.g., spurious aircraft). Using these embodiments in combination can improve the reliability of detection and removal of an either spurious aircraft response and/or point and point-like ground clutter targets.

Figure 5:
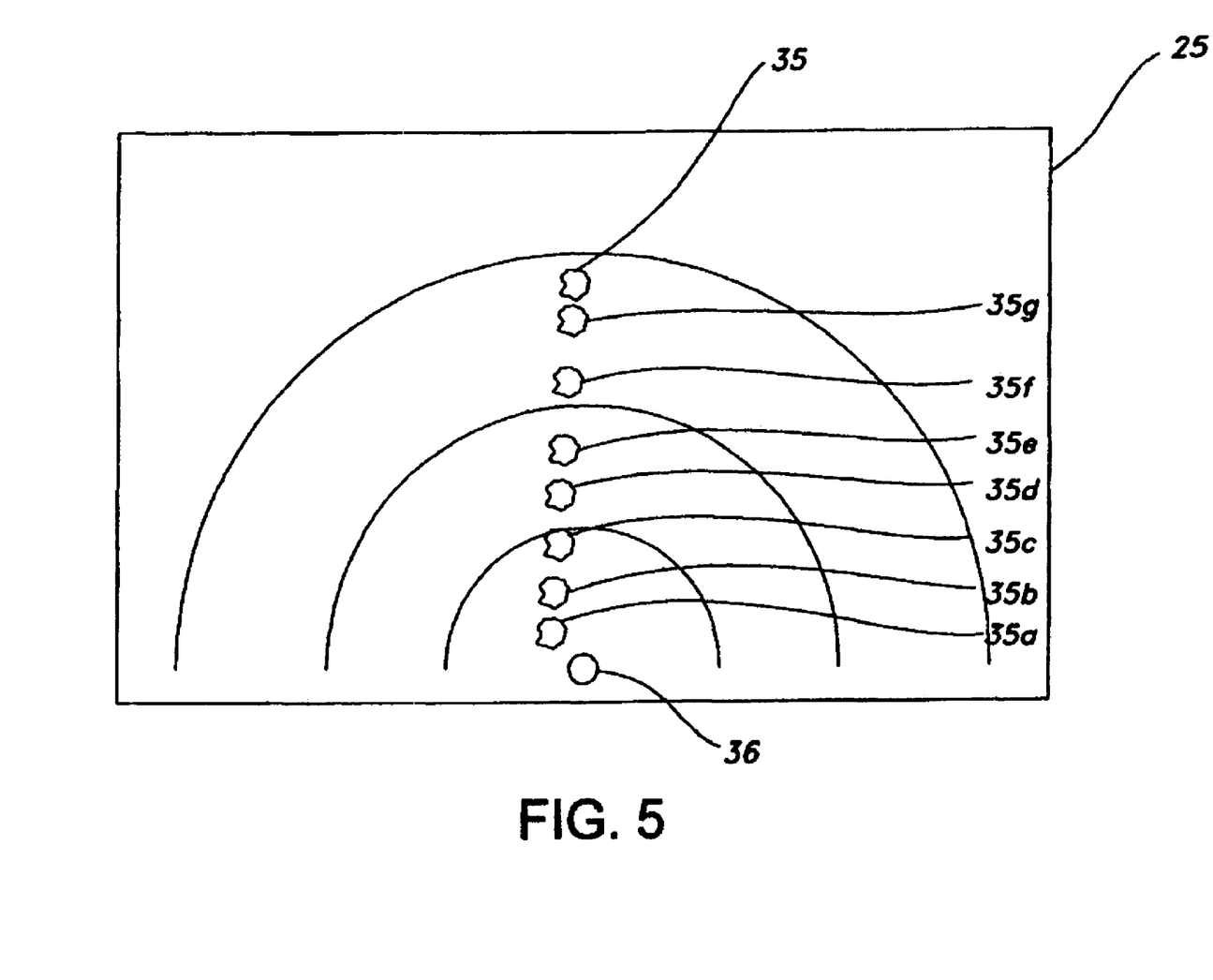
FIG. 5 shows a weather radar display with a spurious aircraft image.

The weather radar display 25 with a spurious aircraft 35 image is shown in FIG. 5. An aircraft with the weather radar system 10 is located at aircraft position 36. The spurious aircraft 35 appears in multiple positions on the display 25 because of the multiscan operation of the weather radar system 10 and the motion of the spurious aircraft 35. The spurious aircraft 35 is located at some distance in front of and is moving in the same direction as the aircraft 36 with the radar system 10 on board. The first spurious aircraft image 35a is generated and displayed from an earlier return when the radar equipped aircraft 36 was further away from the present shown position. The spurious aircraft image 35a was made from returns received, stored, and translated due to aircraft 36 motion. The next spurious aircraft image 35b was generated from returns from spurious aircraft 35 at a short time later that were stored and translated. The other images 35c, 35d, 35e, 35f, and 35g were generated in a similar manner. The final spurious aircraft image 35 is the current position of the spurious aircraft 35.

Figure 6:
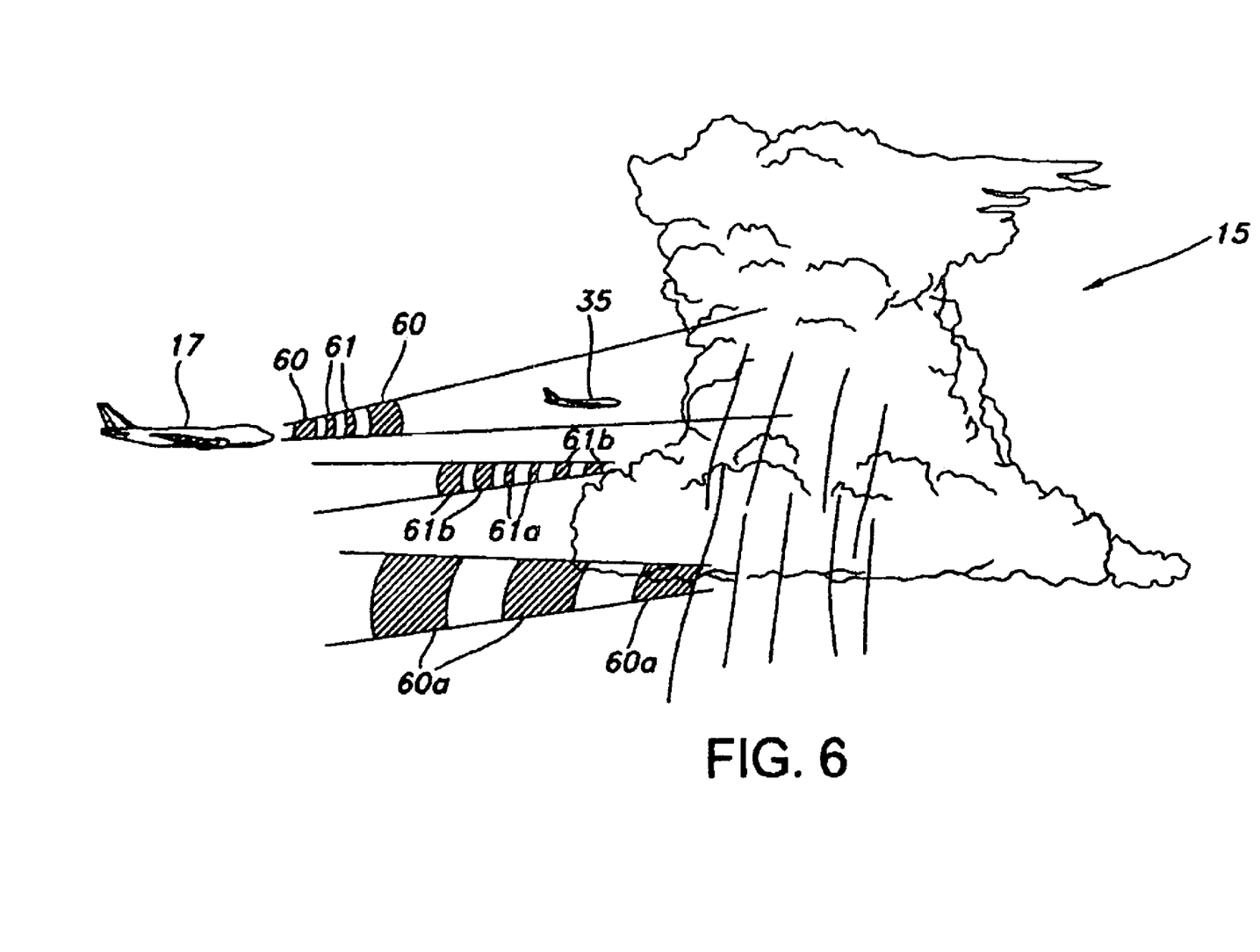
FIG. 6 shows a first embodiment where radar return length differentiation is used to separate and edit out shorter spurious aircraft returns from longer length weather returns in the weather radar system of FIG. 1.

In a first embodiment shown in FIG. 6, radar return length differentiation is used to separate and edit out shorter returns from the spurious aircraft 35 from longer length weather returns in the weather radar system 10 of FIG. 1. The weather radar system 10 of FIG. 1 may intermix high resolution pulses 61, such as short pulses or compressed long pulses, and long pulses 60 as shown in FIG. 6 while scanning a weather system such as thunderstorm 15. The weather radar system 10 may transmit just the high resolution pulses 61. The receiver-transmitter 20 transmits the high resolution pulses 61 that result in high resolution return pulses 61a from the spurious aircraft 35 and high resolution return pulses 61b from the thunderstorm 15.

High resolution return pulses 61a from high resolution pulses 61 may not be used for radar display because of low loop gain due to bandwidth but may still be used to identify spurious aircraft 35. The high resolution return pulses 61a from the spurious aircraft 35 are shorter than the high resolution return pulses 61b from the thunderstorm 15 since the weather system is much larger than the spurious aircraft 35. The transmitted long pulse 60 may not result in a return from the spurious aircraft 35 at close range since the long pulse 60 is still being sent when a return from the long pulse 60a is ready to be received but cannot since the radar is still transmitting. The processor 22 compares the high resolution return pulses 61a from the spurious aircraft 35 to a model for point targets and longer high resolution return pulses 61b from the weather system 15 to a model for volume targets and determines that the high resolution return pulses 61a are from the spurious aircraft 35. The spurious aircraft 35 is a point or point-like target that produces short length returns. The weather system 15 is a volume target that produces longer length returns. The range at which the processor 22 in FIG. 1 identifies the spurious aircraft 35 using the high resolution pulses 61 can be edited from the higher loop gain long pulse returns 60a to remove the spurious aircraft 35 from the display 25.

Figure 7:
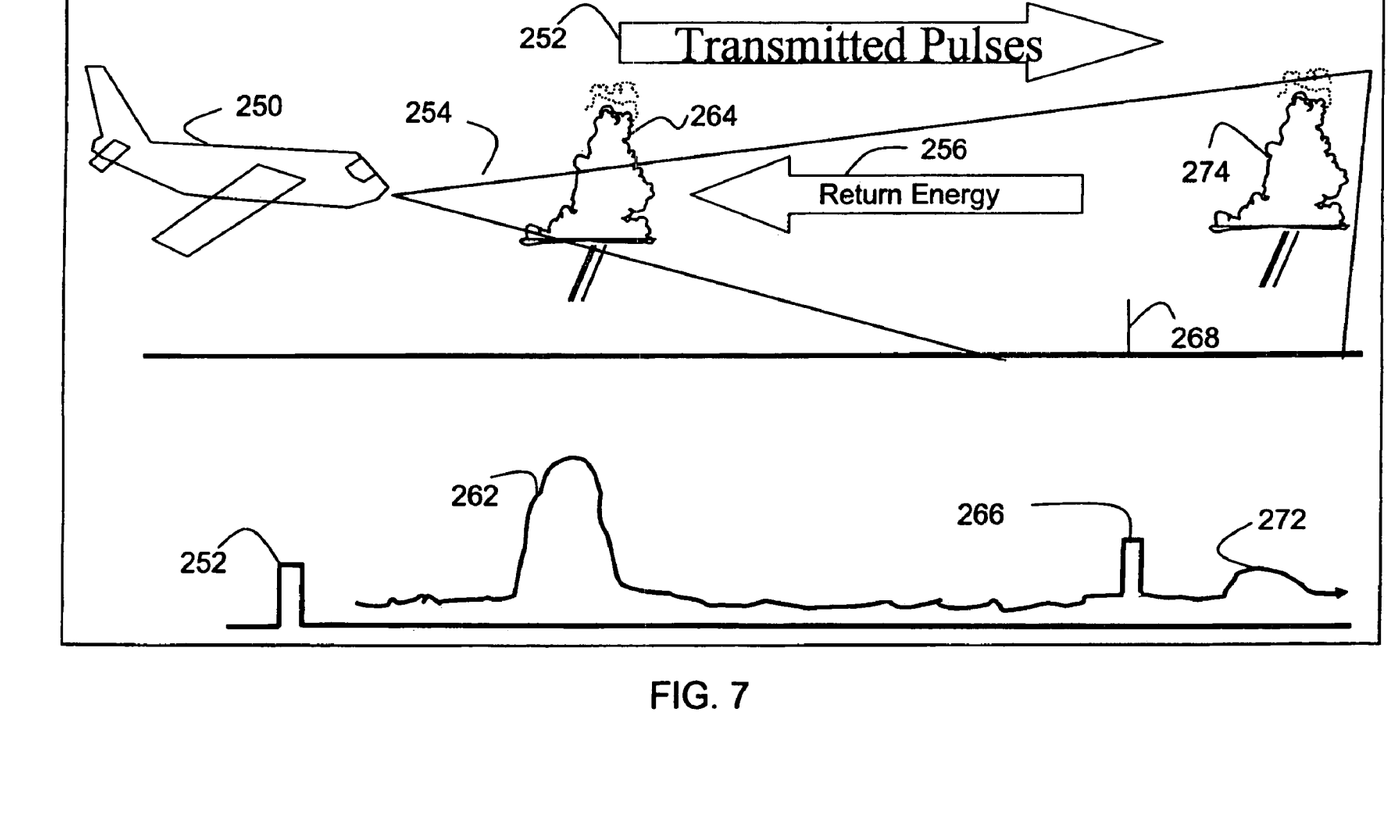
FIG. 7 shows a second embodiment where radar return length differentiation is used to separate and edit out shorter ground clutter point-like or point targets from longer length weather returns.

With reference to FIG. 7, system 10 is employed on an airplane 250 to provide transmit pulses 252 across a beam field 254 in accordance with a second embodiment. Return energy 256 from transmit pulses 252 are received by airplane 250. Radar returns 262 are from a lengthy volume target such as weather target 264. Radar return 266 is from a point or point-like target such as point target 268 that is located on the ground. Return 266 is indicative of a ground clutter point target received echo. Return 272 is associated with a weather target 274. System 10 can utilize radar return length differentiation to separate and edit out shorter ground clutter point-like or point targets, such as, target 268, from longer length weather returns, such as, returns 262 and 274.

In a third embodiment, areas of radar returns from the spurious aircraft 35 that are eliminated from the weather display 25 by using any of the other methods described herein can be tracked into regions where neither the original nor other methods provide detection. The spurious aircraft 35 can continue to be removed by tracking the spurious aircraft 35 into regions where it cannot be detected. As an example in FIG. 8, the antenna 19 on an aircraft 17 points the upper radar beam 30 down to receive return pulses from the weather system 15 and also receives return pulses in the upper radar beam 30 field of view. The processor 22 determines if the return pulses in the upper radar beam 30 field of view are from the spurious aircraft 35 by the size and extent of a vertical gradient return compared to the pulse returns from the weather system 15. The processor 22 identifies the pulses returns as being from the spurious aircraft 35 and accumulates tracking data of the spurious aircraft 35. The antenna 19 receives pulse returns with a lower radar beam 31 at a different tilt angle than the upper radar beam 30 from the spurious aircraft 35 as the spurious aircraft 35 passes into a field of view of the lower beam 31 and is no longer identified as the spurious aircraft 35 by the vertical gradient return by the processor 22. If good track logic data has been accumulated by the weather radar system 10, the spurious aircraft 35 can continue to be identified by the processor 22 when the spurious aircraft 35 is illuminated with the lower beam 31 and removed from the weather radar display 25 by the processor 22.

Figure 8:
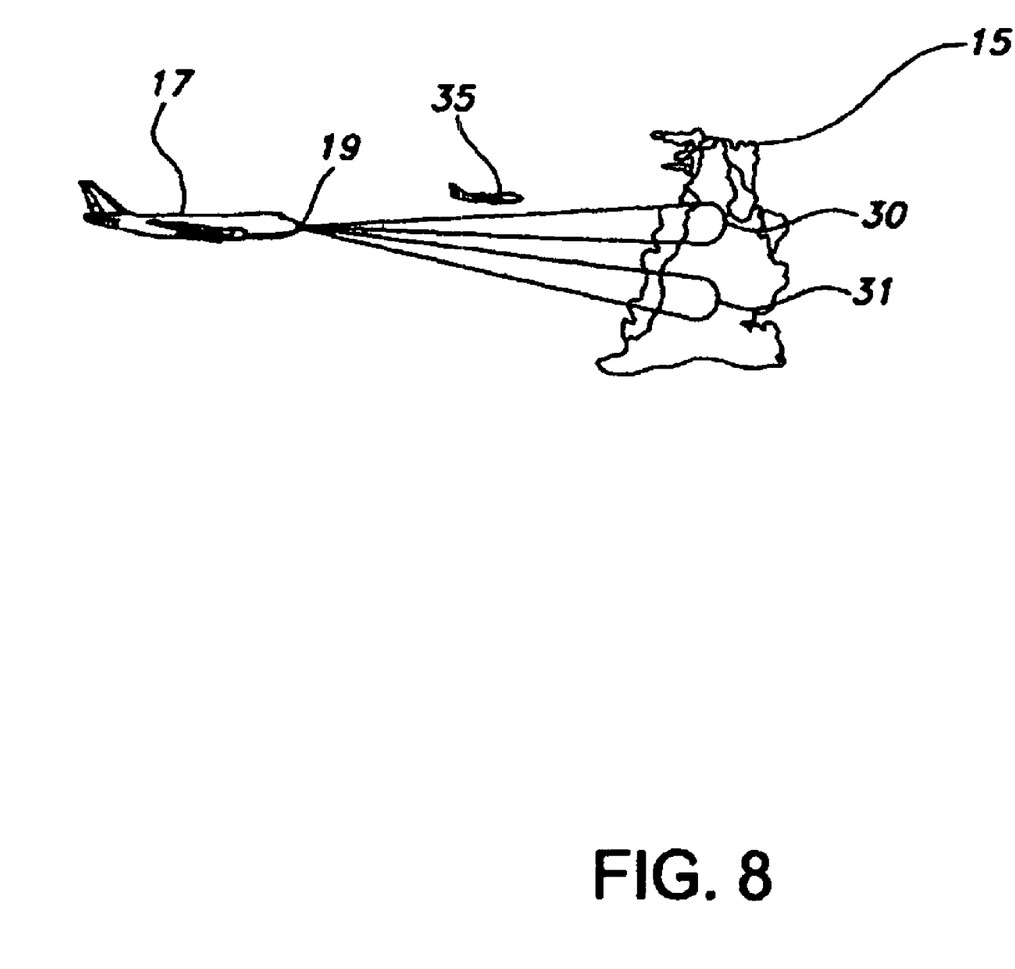
FIG. 8 illustrates a third embodiment where areas of radar returns that have previously been eliminated from a weather display can be tracked into regions where neither the original nor other methods provide differentiation.

FIG. 8 shows an example of the third embodiment and other configurations are possible. For example, an aircraft may be located in the lower beam 31 field of view and may be identified as the spurious aircraft 35. The spurious aircraft 35 can then move out of the lower beam 31 into the upper beam 30 field of view where it is tracked using track logic data accumulated by the weather radar system 10. The spurious aircraft 35 can continue to be identified by the processor 22 when in the upper beam 30 and can be removed from the weather radar display 25 by the processor 22.

Figure 9:
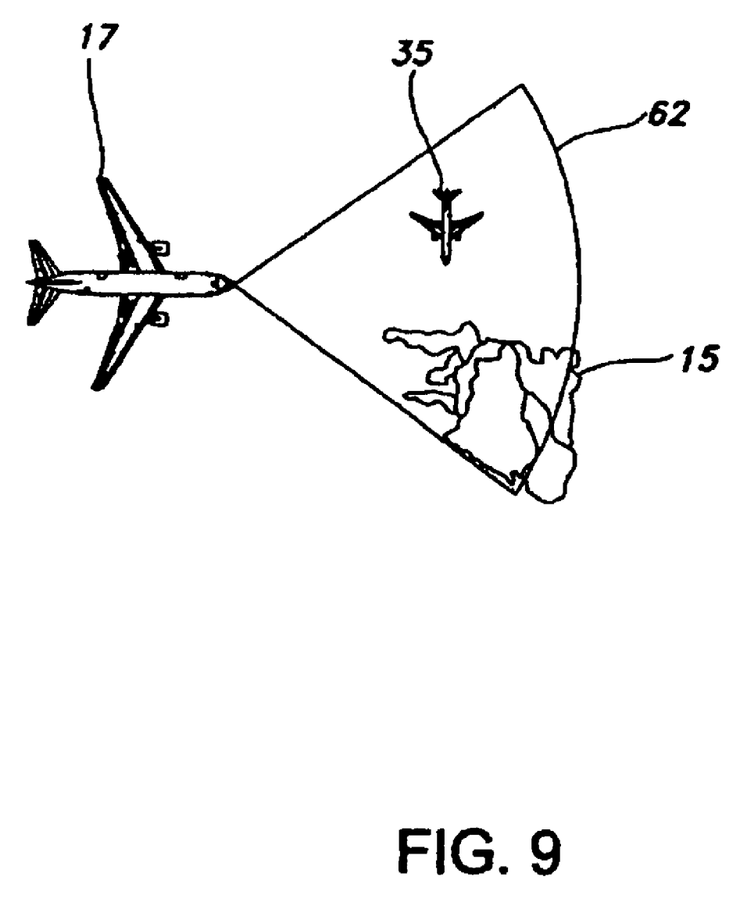
FIG. 9 illustrates a fourth embodiment where tracking areas of radar pulse returns also allows detection and removal of a spurious point or point-like targets in some relative geometries.

In a fourth embodiment, radar returns from the spurious aircraft 35 are tracked that allow detection and removal of the spurious aircraft 35 in certain relative geometries created by the motion and position of the spurious aircraft 35 relative to the weather system 15. In FIG. 9, consider the spurious aircraft 35 moving across the weather radar system 10 field of view 62 in front of the weather system 15. Since both the radar equipped aircraft 17 and the spurious aircraft 35 are in an environmental airflow, the tracked movement of the spurious aircraft 35 across the radar's field of view 62 produces return pulses that are not like return pulses from weather system 15. The relative geometries that allow detection include motion of the spurious aircraft 35 across the radar's field of view with horizontal, climbing or descending aircraft motion. Motion of the spurious aircraft 35 produces returns that are different than the returns from the weather system 15, thereby allowing identification of the spurious aircraft 35 and removal from the display 25 by the processor 22.

Several embodiments for removing a spurious aircraft 35 and other point or point-like targets from a weather radar display 25 are disclosed. These embodiments may be used individually or in combination to generate high confidence for removal of point targets or point-like targets (e.g., spurious aircraft 35, ground targets, etc.) in a weather radar display 25.

Figure 10:
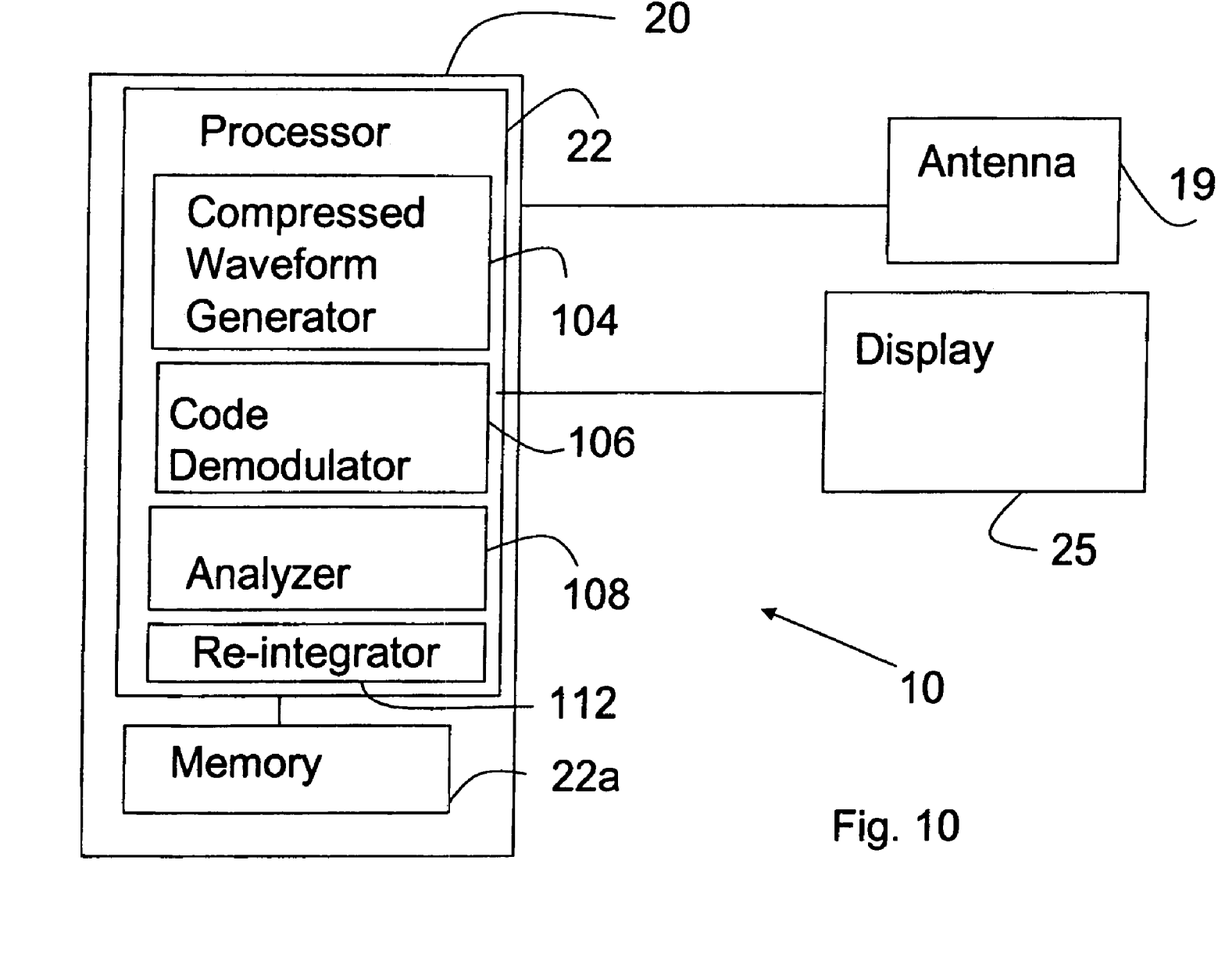
FIG. 10 is a general block diagram of a weather radar system illustrated in FIG. 1 configured according to an exemplary embodiment to achieve variable loop gain and resolution.

In FIG. 10, system 10 is configured in accordance with a preferred exemplary embodiment. System 10 includes receiver-transmitter 20 coupled to antenna 19 and display 25. Receiver-transmitter 20 includes a processor 22 and memory 22a.

Antenna 19 can be any type of antenna of any size. Alternatively, antenna 19 can be a small antenna such as the smaller antennas associated with next generation windshear radars. In one embodiment, antenna 19 can have a 28-38 inch antenna diameter. In another embodiment, antenna 19 can have a diameter of 24 inches or less or 12 inches or less. A larger antenna can also benefit from the techniques in the present application and even utilize lower power amplification due to the benefits of the techniques in the present application.

Processor 22 includes a compressed waveform generator 104, a code demodulator 106, an analyzer 108 and a reintegrator 112. Generator 104, code demodulator 106, analyzer 108 and reintegrator 112 are shown as part of processor 22. However, these components can be coupled together in a variety of fashions, can be distinct units, and can exchange data directly or through memory 22a.

Compressed waveform generator 104, code demodulator 106, analyzer 108, and reintegrator 112 can be implemented by a combination of circuitry and software. For example, programmable logic devices can be utilized to form code demodulator 106 and analyzer 108 can be a software executed by a digital signal processor. Similarly, reintegrator 112 can be a software implemented filter.

Compressed waveform generator 104 can be implemented as any phase or frequency agile direct digital synthesizer capable of implementing any of the compression schemes enumerated below (e.g., a phase shift capable direct synthesizer source). Code demodulator 106 can be implemented as a device capable of producing high resolution data from the compression schemes described below (e.g., a matched filter). Analyzer 108 and reintegrator 112 are implemented as a software programmed digital signal processor (DSP). The DSP for analyzer 108 and reintegrator 112 can be the same. The structure and architecture discussed in FIG. 10 are exemplary only.

System 10 is advantageously configured to allow range resolution and loop gain to be actively exchanged as desired. System 10 also provides analyses on high resolution data and reassembles the high resolution data for lower bandwidth, high gain analyses. Applicants believe that these advantages allow the use of system 10 with all antenna sizes, but are particularly significant with small antenna sizes and applications such as windshear detection or like systems.

Compressed waveform generator 104 preferably provides transmitter pulses for weather radar operation. The transmitter pulses are preferably compressed pulses (e.g. short pulses or compressed long pulses). High resolution compressed waveforms can be generated by generator 104 using linear frequency modulation, non-linear frequency modulation, stepped frequency modulation, or phase encoding (binary, polyphase, etc.). In one embodiment, high resolution compressed pulses are utilized as opposed to using conventional long pulses where bandwidth and time are directly related. High resolution compressed pulses are used so that radar returns can be resolved into finer range increments.

In one embodiment, compressed waveform generator 104 allows system 10 to produce an X-band signal across a pulse length that is 25 microseconds long. The X-band signal includes a code (e.g., a chirp signals) every microsecond. The chirp signal can be a phase or frequency signature that can be recovered after transmission. In one embodiment, the chirp signal is a discrete phase change or phase reversal.

The phase chirp can operate as a code which can be utilized after transmission for analyzing and processing data. In one embodiment, compressed waveform generator 104 provides a Barker code within the X-band signal. In another embodiment, such as for a windshear application, compressed waveform generator 104 provides a pulse length of approximately 3 microseconds divided into 13 portions associated with the Barker Code. The 13 portions are each approximately quarter microsecond portions.

Antenna 19 receives return pulses associated with the pulses provided by compressed waveform generator 104. Code demodulator 106 processes the return pulses to provide high resolution data. The high resolution data can be generated utilizing a conventional pulse compression convolution process. The high resolution data can be stored in memory 22*a* for subsequent analysis by analyzer 108 and reintegration by reintegrator 112.

The format of storing the high resolution data can be in any form. Preferably, the high resolution data is stored in range, azimuth form on a per elevation beam basis. Alternatively, the data is stored in a volumetric format.

System 10 through analyzer 108 processes the high resolution data to detect and identify point targets. Analyzer 108 can employ any of the processes discussed in this application to identify a point target. Such processes can be implemented in analyzer 108. Alternative processes can also be utilized without departing from the scope of the invention.

The point targets can be ground point targets as well as spurious aircraft. Once detected, point targets can be removed from the high resolution data or removed from the data used for non-point target analysis. Alternatively, other editing processes for removing point target responses can be utilized.

When system 10 is additionally determining the presence of weather features that are larger than the range resolution associated with the high resolution data, point and point-like targets may be removed and the remaining high resolution data can be coherently integrated in reintegrator 112 to produce low bandwidth or high loop gain data. Preferably, the high resolution data is reintegrated in range to produce data that has reduced ground clutter. Applicants believe such reintegration provides significant advantages when utilizing smaller antennas 19.

Preferably, analysis of the high resolution data to determine short range data can be performed at the same time that high loop gain data is being estimated and long range targets are estimated. In one embodiment, short range high resolution targets are detected before estimates of long range targets are completed. This technique advantageously allows more radar processes to execute for given scan rates and advantageously does not require separate transmit pulses for each analyses. The results of the analysis by analyzer 108 and reintegrator 112 can be stored in memory 22*a* and can be displayed on display 25.

By using reintegrator 112, code modulator 106, high resolution data and low bandwidth/high gain data can be produced by system 10. Analyzer 108 can be utilized to provide both high resolution analysis, such as, for analyzing point and/or point-like targets, and low bandwidth/high gain analysis, such as, for analyzing larger weather systems. Applicants believe that system 10 is able to add high resolution range samples together to obtain a desired range resolution and bandwidth system. Accordingly, high resolution for a short range display can be achieved with the same signals utilized for a longer range that typically requires more loop gain but not as much resolution.

Figure 11:
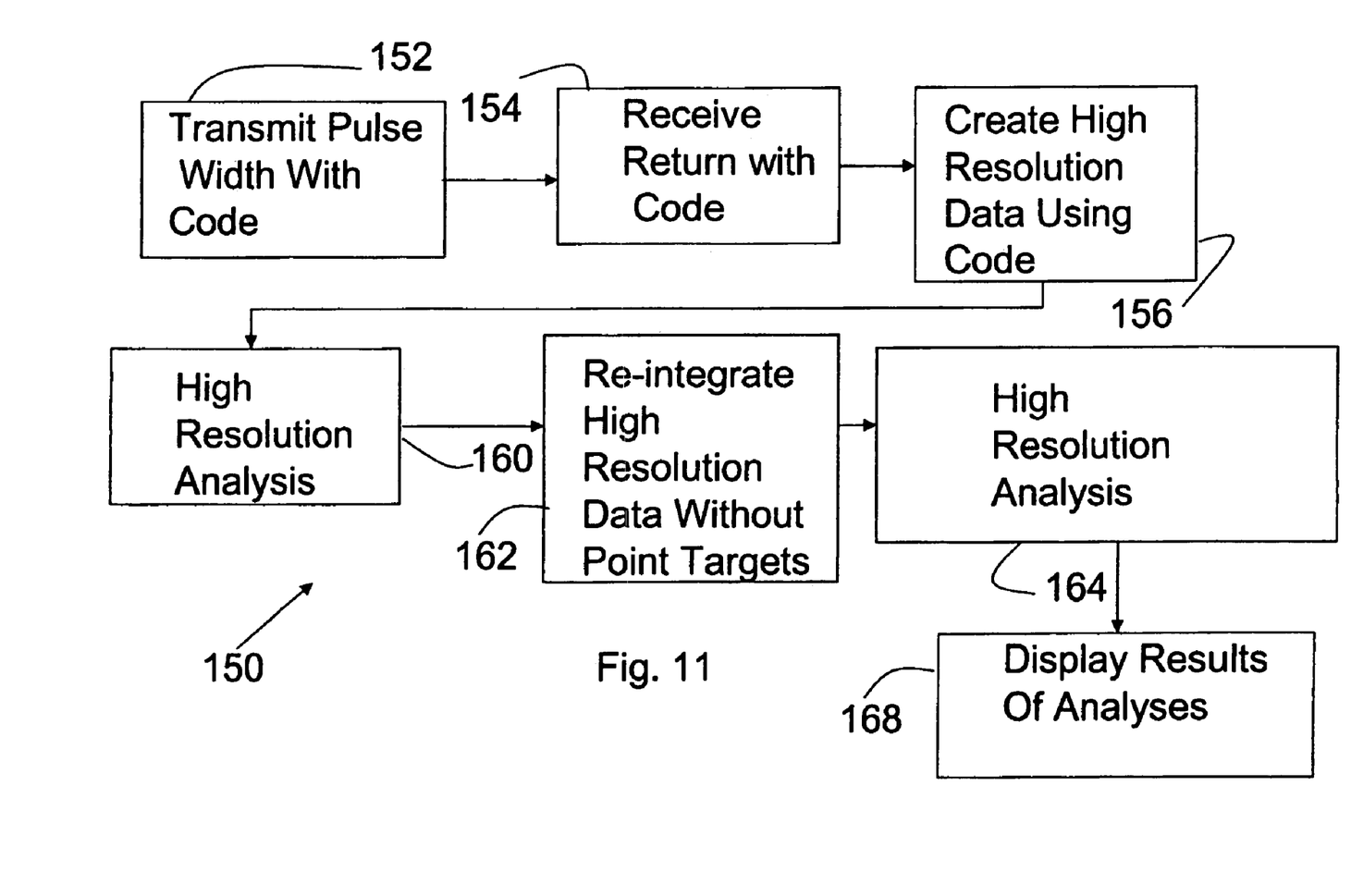
FIG. 11 is a flow diagram showing exemplary operation of the system illustrated in FIG. 10.

With reference to FIG. 11, operation of a system similar to system 10 discussed preference to FIG. 10 is described. System 10 preferably operates according to flow diagram 150. At a step 152 a pulse width with a code is transmitted. At a step 154, radar returns are received. The radar returns preferably include the code provided at step 152.

At a step 156, the pulse returns are utilized to create high resolution data using the code. At a step 160, high resolution analysis is performed on the high resolution data. The high resolution analysis can be utilized to determine point and point-like targets or sources. At a step 162, system 10 uses editing capabilities to reintegrate high resolution data without point targets. In one embodiment, point and point-like targets are completely removed or otherwise edited from the high resolution data. The high resolution data is then added back together to assemble an average after editing has occurred, which provides high sensitivity to weather targets.

The editing process may cause a high range bin or two to be lost. Various mathematical processes can be utilized to replace the lost range bins including averaging. At a step 164, high resolution analysis can be performed to determine the presence of weather radar systems. At a step 168, the results of analyses in steps 160 and 164 can be displayed. Alternatively, results of only one of the analyses in steps 160 and 164 can be displayed.

While the detailed drawings, specific examples, and particular formulations given describe preferred and exemplary embodiments, they serve the purpose of illustration only. The inventions disclosed are not limited to the specific forms shown. For example, the various functions may be performed in any of a variety of sequence steps, or by any of a variety of hardware and software combinations. The systems and methods depicted and described are not limited to the precise details and conditions disclosed. Furthermore, other substitutions, modifications, changes, and omissions may be made in the design, operating condition and arrangements and be exemplary embodiments without departing from the scope of the invention as expressed in the appended claims.

What is claimed is:

1. A weather radar system coupled to an antenna, the weather radar system comprising:
   a processor for controlling pulses provided to the antenna and for processing return pulses received by the antenna; and
   wherein the processor is configured to generate high resolution data from the return pulses, to use the high resolution data to perform high resolution radar analysis, and to reassemble the high resolution data to perform high gain radar analysis.

2. The weather radar system of claim 1, wherein the processor is further configured to cause the pulses provided to the antenna to have a pulse length and include multiple resolvable range elements across the pulse length.

3. The weather radar system of claim 2, wherein the processor further comprises an analyzer configured to perform the high resolution radar analysis to detect a spurious aircraft or spurious ground target.

4. The weather radar system of claim 1, wherein the processor further comprises a compressed waveform generator and wherein the processor is further configured to cause the pulses provided to the antenna to be compressed or non-compressed.

5. The weather radar system of claim 1, wherein the processor further comprises an analyzer that is configured to use the high resolution data analysis to detect point sources, and to remove data caused by the point sources.

6. The weather radar system of claim 1, wherein the antenna has a diameter of 24 inches or less.

7. The weather radar system of claim 1, wherein the processor is further configured to utilize variable resolution and loop gain.

8. The weather radar system of claim 1, wherein the processor further comprises a re-integrator configured to coherently integrate the high resolution data for the high gain radar analysis.

9. A method of detecting a weather system using avionics weather radar system, the method comprising the steps of:
   transmitting pulses;
   receiving return pulses;
   generating high resolution data from the return pulses;
   using the high resolution data to perform high resolution radar analysis;
   using the high resolution data to form high gain data; and
   displaying, with a weather radar display, the weather system in response to the high gain data.

10. A method of detecting a weather system using avionics weather radar system, the method comprising the steps of:
   transmitting pulses;
   receiving return pulses;
   generating high resolution data from the return pulses;
   using the high resolution data to form high gain data; and
   displaying, with a weather radar display, the weather system in response to the high gain data;
   estimating short resolution targets at the same time the high gain data is formed.

11. The method of claim 10, further comprising the step of:
   identifying point or point-like targets from the high resolution data.

12. The method of claim 11, wherein the step of identifying point or point-like targets further comprises the step of:
   determining at least a portion of the high resolution data is caused by the point or point-like targets when the portion has a short length.

13. The method of claim 9, further comprising the step of:
   removing point source data in the high resolution data when forming the high gain data.

14. The method of claim 9, wherein the pulses have a pulse width, wherein a code is present in the pulse width, the code being used to form the high resolution data.

15. An avionic weather radar system, comprising:
   means for analyzing high resolution data associated with radar returns;
   means for accumulating the high resolution data to form high gain data.

16. An avionic weather radar system, comprising:
   means for analyzing high-resolution data associated with radar returns;
   means for accumulating the high resolution data to form high gain data;
   means for generating high resolution pulses;
   means for transmitting the high resolution pulses to detect weather systems;
   means for receiving the radar returns including high resolution pulse returns; and
   means for identifying point or point-like targets from the high resolution pulse returns.

17. The system of claim 16, further comprising:
   means for comparing the high resolution pulse returns from the point or point-like targets and the high resolution pulse returns from the weather system to a model.

18. The system of claim 17, wherein the high resolution pulses include a code provided across a pulse length.

19. The system of claim 18, wherein the code is Barker Code.

20. The system of claim 17, wherein short range high resolution targets are determined before an estimation of long range targets is completed.

* * * * *